United States Patent [19]

Beach

[11] 3,748,991

[45] July 31, 1973

[54] DEVICE FOR PREVENTING FILM MOVEMENT IN STILL CAMERAS

[75] Inventor: David E. Beach, Penfield, N.Y.

[73] Assignee: Eastman Kodak Company, Rochester, N.Y.

[22] Filed: Aug. 21, 1972

[21] Appl. No.: 282,628

[52] U.S. Cl. .......................... 95/31 FM, 95/31 FL
[51] Int. Cl. ........................................ G03b 19/04
[58] Field of Search ........... 95/31 FM, 31 R, 31 FL; 242/71.4

[56] References Cited
UNITED STATES PATENTS

| | | | |
|---|---|---|---|
| 3,603,236 | 9/1971 | Engelsmann | 95/31 FM |
| 3,682,066 | 8/1972 | Simon | 95/31 FM |
| 3,628,432 | 12/1971 | Ettischer | 95/31 FM |
| 3,148,605 | 9/1964 | Peterson et al. | 242/71.4 X |

Primary Examiner—Richard L. Moses
Attorney—W. H. J. Kline et al.

[57] ABSTRACT

A camera for perforated roll film includes a transport mechanism for advancing film along an exposure plane and a metering mechanism for selectively disabling the transport mechanism. A film sensing pawl is movable by advancing film from an extended position traversing the film through a film perforation to a metering position spaced from the extended position in the direction of film advancement. A control member is movably mounted in the camera for movement with the sensing pawl and is associated with the metering mechanism for disabling the transport means when the sensing pawl reaches its metering position. A spring force on the control member urges the sensing pawl from its metering position toward its extended position. Means are provided for relieving the spring force on the sensing pawl at least during operation of the camers's exposure mechanism so that the spring force is not transmitted through the sensing pawl to the film.

7 Claims, 6 Drawing Figures

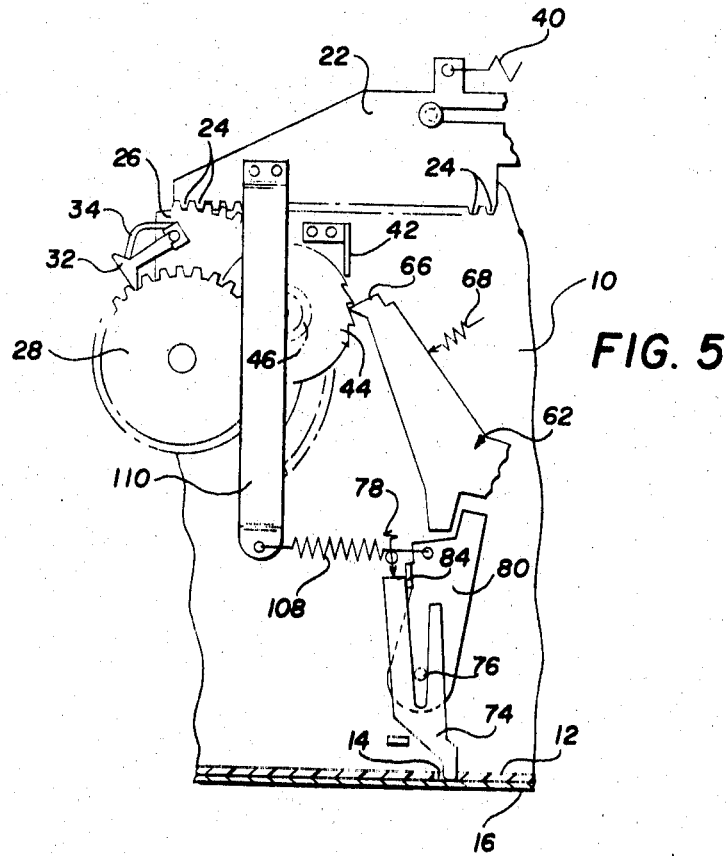
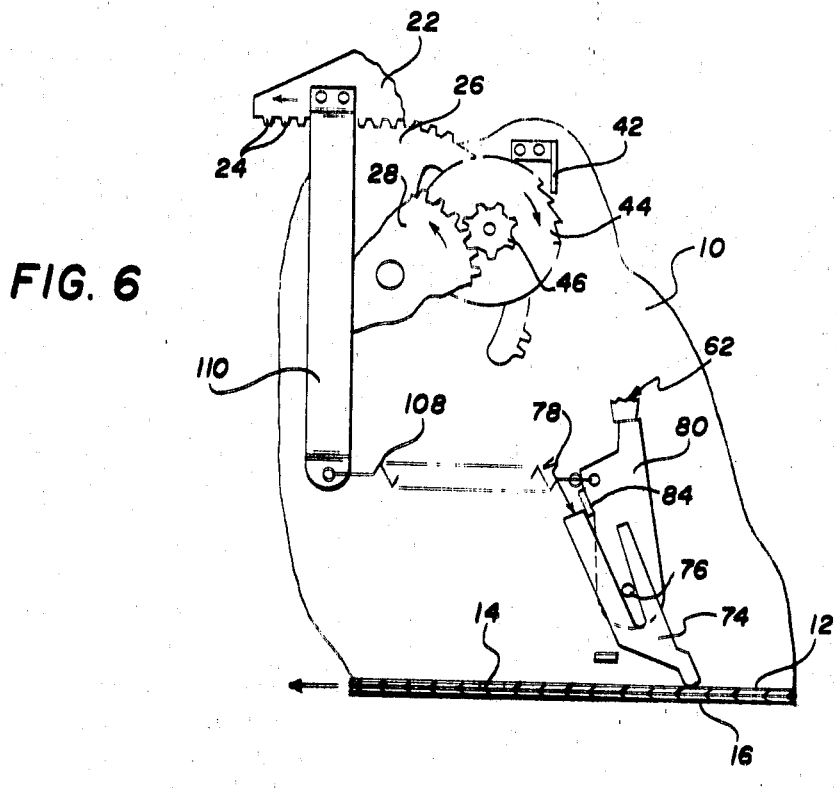
FIG. 5
FIG. 6

DEVICE FOR PREVENTING FILM MOVEMENT IN STILL CAMERAS

CROSS-REFERENCE TO RELATED APPLICATIONS

Reference is made to commonly assigned, copending U.S. Pat. applications Ser. No. 203,524, entitled FILM METERING MECHANISM FOR CAMERAS, filed Dec. 1, 1971 in the name of David E. Beach and Ser. No. 282,631, entitled DEVICE FOR PREVENTING FILM MOVEMENT IN CAMERAS filed concurrently herewith in the names of Helmut Ettischer and Wolfgang Ort.

BACKGROUND OF THE INVENTION

1. Field of the Invention

The present invention relates to cameras having means for detecting the presence of a film perforation to selectively lock and release the film transport mechanism, and more particularly to such cameras having means for minimizing any surge of force from the detecting means onto the film during an exposure interval.

2. Description of the Prior Art

The present invention is an improvement over cameras of the type disclosed in copending, coassigned U.S. Pat. application Ser. No. 203,524, entitled "Film Metering Mechanism for Cameras" filed Dec. 1, 1971 in the name of David E. Beach. In the camera therein disclosed, a metering lever is movable between an active position disabling the camera's film transport mechanism and an inactive position. A film sensing pawl is mounted for movement from a retracted position engaging the film surface, through an extended position transversing the film when intercepting one of the film perforations, to a metering position spaced from the extended position in the direction of film advancement by the trailing edge of the perforation as the film is advanced. The film sensing pawl and the metering lever are associated such that the metering lever is moved to its active position upon movement of the sensing pawl to its metering position. A spring urges the sensing pawl from its metering position towards its extended position and, since the metering pawl remains in the film perforation during exposure, the spring force is applied also to the trailing edge of the film perforation. This force on the film is opposed by frictional forces between camera elements and between the film and camera and/or cartridge surfaces. When the shutter is tripped, minor vibrations travel through the camera. These vibrations may relieve static friction wherever it occurs within the camera. Loss of frictional forces restraining the film can cause the spring force on the film from the pawl to move the film during exposure.

SUMMARY OF THE INVENTION

It is an object of the present invention to reduce or eliminate the possibility of film movement during the exposure period by eliminating or reducing the force of the film sensing pawl on the trailing edge of the film perforation during a picture-taking operation when the camera vibrations can suddenly relieve frictional restraints.

In a preferred embodiment of the invention, this object has been accomplished by physically removing the spring which applies the force to the spring sensing pawl from contact with the sensing pawl except when film is being advanced. In another preferred embodiment of the present invention, the spring force on the sensing pawl is removed upon actuation of the camera's shutter release lever. In yet another preferred embodiment, the spring force is reduced when film is not being advanced.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 5 is a view of a portion of a camera in accordance with yet another embodiment of the present invention and showing the camera elements in their positions ready to make an exposure; and FIG. 6 is a view similar to FIG. 5 showing the camera elements as film is being advanced.

DESCRIPTION OF THE PREFERRED EMBODIMENTS

Because cameras are well known, the present description will be directed in particular to elements forming part of, or cooperating more directly with, apparatus in accordance with the present invention. It is to be understood that camera elements not specifically shown or described may take various forms well known to those skilled in the art.

EMBODIMENT OF FIGS. 1 AND 2

Figure 1:
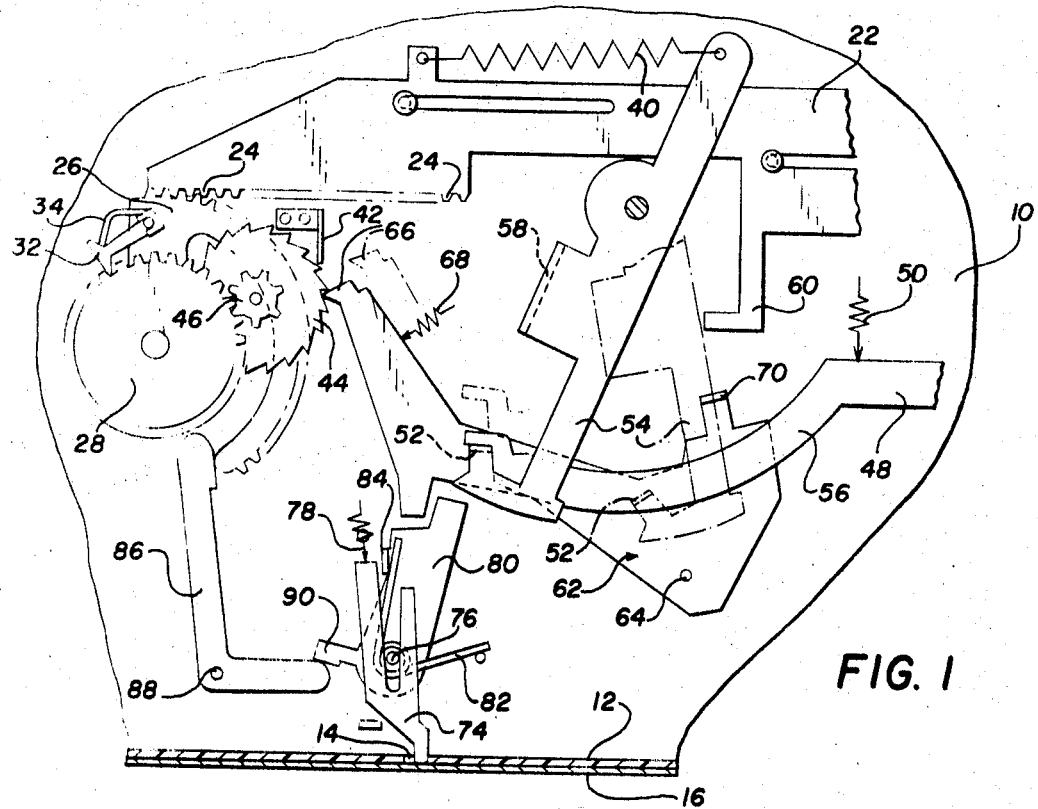
FIG. 1 is a view of a portion of a camera in accordance with the present invention and showing the camera elements in their positions ready to make an exposure.
Figure 2:
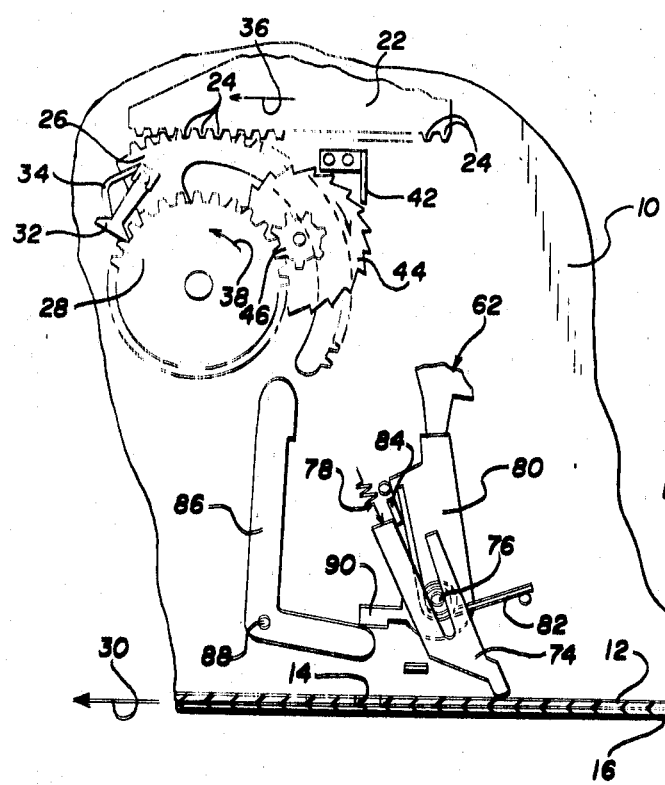
FIG. 2 is a view similar to FIG. 1 showing the camera elements in their positions as film is being advanced.

Referring to FIGS. 1 and 2, the camera illustrated includes a housing 10 into which a strip 12 of film perforated at predetermined metering intervals, such as at 14, and a strip of opaque backing paper 16 has been loaded. The film may be contained in a cartridge of the type shown in coassigned U.S. Pat. No. 3,138,081 which issued on June 23, 1964 to Hubert Nerwin.

A slide member 22 is reciprocally mounted on housing 10 by a pin-in-slot arrangement. The slide member has a rack with a plurality of teeth 24 in meshing engagement with the teeth of a gear sector 26 coaxially rotatable with a gear 28. Rotation of gear 28 in the direction of arrow 38 in FIG. 2 winds film in the direction of arrow 30. Gear 28 has teeth in meshing engagement with a ratchet pawl 32 rotatably mounted on gear sector 26 and biased by a spring 34 into engagement with the teeth of gear 28 so that upon movement of slide member 22 in the direction of arrow 36 in FIG. 2, the rotary movement of gear sector 26 is transmitted to rotate gear 28 in the direction of arrow 38, thereby advancing film along the camera's exposure plane in the direction of arrow 30. As slide member 22 is returned to the right by a spring 40, gear 28 is prevented from rotating in a counterclockwise direction by a leaf spring 42 which cooperates with the teeth on a ratchet wheel 44 on a gear 46 in meshing engagement with gear 28.

A shutter release lever 48 is pivotally mounted on the camera housing and may be raised against the force of a spring 50. Movement of shutter release lever 48 downwardly by spring 50 is limited by an abutment 52 on a high energy lever 54. Shutter release over 48 has an arcuate portion 56. High energy lever 54 is pivotally mounted on housing 10 and is biased by spring 40 for rotation in a counterclockwise direction. Lever 54 is held against such rotation by tab 52 which latches over shutter release lever 48 until the shutter release lever is raised. A bent tab portion 58 on high energy lever 54 is aligned with a projection 60 on slide member 22 to cock the high energy lever when the slide member is moved to the left.

A metering lever 62 is rotatably carried on housing 10 by a stud 64 and carries a metering pawl 66 urged toward an active position in engagement with the teeth of ratchet 44 by a spring 68 to prevent rotation of gear 28. A tab 70 on metering lever 56 is in alignment with high energy lever 54.

A film sensing pawl 74 is mounted for rotational and longitudinal movement on a stud 76 and is urged by a spring 78 toward film 12. A control member 80 is also rotatably carried by stud 76 and is urged in a counterclockwise direction by a spring 82 so that a tab 84 on the control member engages sensing pawl 74 to rotate the sensing pawl in a counterclockwise direction. A lever 86 is rotatably carried by a stud 88 and has a first leg in alignment with the lower portion of gear sector 26 and a second leg in alignment with a tab 90 on control member 80.

OPERATION

FIG. 1 shows the elements of a camera in their respective positions after the film has been advanced and when the camera is ready to be operated to take a picture. Metering pawl 66 of lever 62 is in its active position in engagement with ratchet 44 so that slide member 22 cannot be moved to the left to transport more film. Film sensing pawl 74 is extended through perforation 14 and has been rotated in a clockwise direction by the advancing film to a metering position. High energy lever 54 has been put into a cocked position by projection 60 of the slide member and is held there against the force of spring 40 by tab 52 engaging the shutter release lever.

Slide member 22 has been returned to the right by spring 40, rotating gear sector 26 in a clockwise direction as it returned. As the gear sector rotated, its lower end engaged the first leg of lever 86 to rotate the lever in a counterclockwise direction. As the lever rotated, its second leg engaged tab 90 of the control member to rotate the control member 80 against the force of spring 82, thereby relieving the force of that spring from sensing pawl 74 so that no side load is placed on film 12 from spring 82. Thus, when the shutter is tripped in a manner described in above-mentioned U.S. Pat. application No. 203,524 and camera vibrations are set up, there is no load on film sensing pawl 74 which might cause film movement to the right due to the loss of frictional resistance as mentioned hereinbefore.

After an exposure has been made, slide 22 may be moved to the left to advance the next film exposure area into alignment with the camera's optical system.

As shown in FIG. 2, movement of the slide member to the left rotates gear sector 26 in a counterclockwise direction, thereby removing the lower portion of the gear sector from the first leg of lever 86. Sensing pawl 74 is cammed from the perforation in a manner described in application No. 203,524, and spring 82 is now free to rotate control member 80 in a counterclockwise direction causing, through tab 84, similar rotation of sensing pawl 74 to a position shown in FIG. 2 in which the sensing pawl rests on the film surface awaiting the arrival of the next succeeding film perforation. When the perforation reaches the sensing pawl, spring 78 causes the pawl to move to an extended position through the perforation so that continued movement of the film will pull the sensing pawl to its metered position shown in FIG. 1 to cause the camera's metering mechanism to disable the transport means as also explained in above-mentioned U.S. Pat. application No. 203,524.

As soon as slide member 22 is released, spring 40 returns the slide member to its position shown in FIG. 1 and lever 86 once again rotates control member 80 in a clockwise direction to relieve the force of spring 82 from the film.

EMBODIMENT OF FIGS. 3 AND 4

Figure 3:
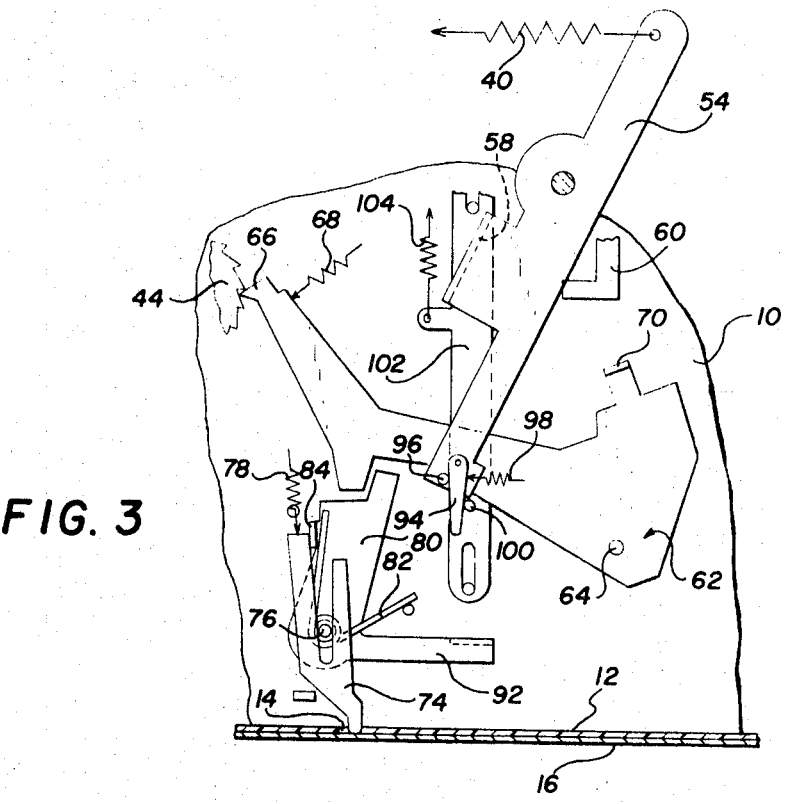
FIG. 3 is a view of a portion of a camera in accordance with a second embodiment of the present invention showing the camera elements in their positions ready to make an exposure.
Figure 4:
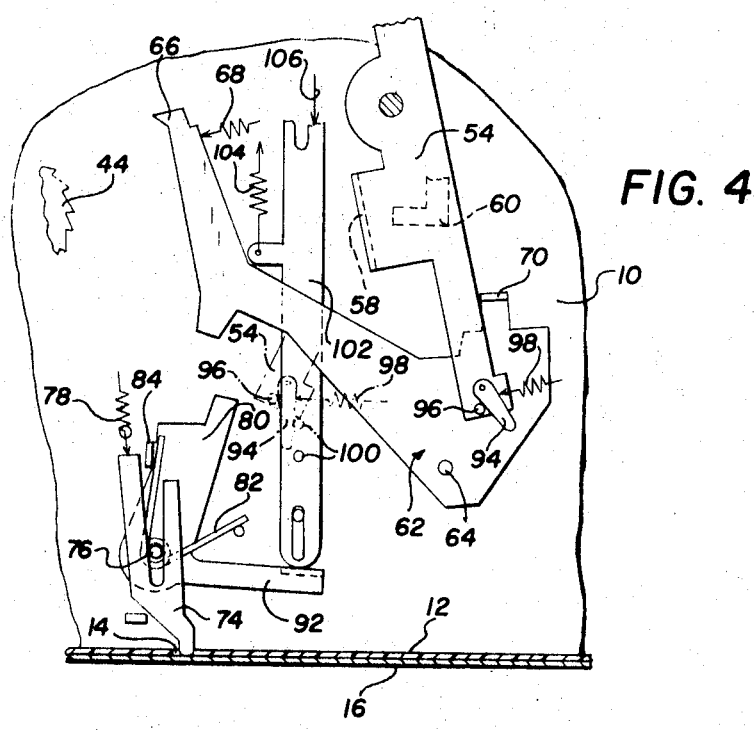
FIG. 4 is a view similar to FIG. 3 immediately following shutter release.

In FIGS. 3 and 4, I have shown a second embodiment of the present invention wherein the same reference numerals used to refer to elements in the first embodiment have been used when no change has been made to those elements. New reference numerals have been assigned to new or modified elements.

Film sensing pawl 74 has been unchanged, and control member 80 is provided with a tab 92 (replacing tab 90 of the first embodiment). High energy lever 54 has a latch member 94 pivoted against a stop 96 by a spring 98. Latch member 94 cooperates with a pin 100 on a shutter release lever 102 which is spring urged upwardly by a spring 104 and may be moved downwardly in the direction of arrow 106 in FIG. 4 to remove pin 100 from latch member 94 so that spring 40 may drive high energy lever 54 in a counterclockwise direction to trip the camera's shutter mechanism, and by engagement with tab 70 on metering lever 62, withdraw metering pawl 66 from ratchet 44. It can be seen that after an exposure, movement of projection 60 to the left during film advancement pushes high energy lever 54, by way of tab 58 so that latch member 94 passes over pin 100 to cock the shutter and to hold the high energy lever until shutter release lever 102 is again depressed.

Referring to FIG. 4, when the shutter release lever is depressed, its lower end portion engages tab 92 on intermediate member 80 to rotate the intermediate member against the force of spring 82 in a clockwise direction to remove tab 84 from engagement with film sensing pawl 74.

Comparing the embodiments of FIGS. 1 and 2 and FIGS. 3 and 4, it can be seen that the force of spring 82 is removed from film sensing pawl 74 except when film is being advanced in the first of said embodiments, and is removed from film sensing pawl 74 when the camera is actuated to take a picture in the second of the embodiments. In both instances, the side load on film 12 from the film sensing pawl is eliminated at least during the interval when the shutter is activated so that such force does not tend to move the film.

EMBODIMENT OF FIGS. 5 AND 6

In the last illustrated embodiment, spring 82 of the first two embodiments has been replaced by a tension spring 108 having one end connected to control member 80 and the other end to an arm 110 which is mounted for movement with slide member 22. When the slide member is returned to the right by spring 40, the force of spring 108 on control member 80 is reduced to a point where the side load on film 12 by sensing pawl 74 is minimal and the risk of film movement because of that force is slight.

As slide member 22 is moved to the left to advance film, arm 110 moves therewith to tension spring 108 and to thereby rotate control member 80 and film sensing pawl 74 in a counterclockwise direction, returning the film sensing pawl to its position ready to detect the arrival of the next film perforation at the pawl.

Because the tension of spring 108 is reduced except during film advance, the risk of film movement during exposure is similarly reduced.

The invention has been described in detail with particular reference to preferred embodiments, but it will be understood that variations and modifications can be effected within the spirit and scope of the invention.

I claim:

1. In a camera adapted to receive roll film perforated at predetermined metering intervals and having (1) transport means for advancing received film along the camera's exposure plane, (2) an exposure mechanism for effecting exposure of the film at said exposure plane, (3) a film sensing member movable by advancing film from a first position extending into a film perforation advanced into alignment with said sensing member to a second position spaced from said first position along said exposure plane in the direction of film advancement, (4) spring means, (5) a control member movable by said spring means into abutment with said sensing member to urge said sensing member toward its first position; the improvement comprising means associated with said control member for relieving the force of said spring means on said sensing member at least during operation of said exposure mechanism.

2. The improvement as defined in claim 1 wherein said spring force relieving means comprises means associated with said transport means and said spring means for relieving said force when said transport means is not being operated.

3. The improvement as defined in claim 1 wherein said spring force relieving means comprises means associated with said transport means and said control member for moving said control member away from said sensing member when said transport means is not being operated.

4. The improvement as defined in claim 1 wherein said spring force relieving means comprises means associated with said transport means and said spring means for at least partially relieving the force of said spring means on said control member when said transport means is not being operated.

5. The improvement as defined in claim 1 wherein:
said exposure mechanism includes a shutter release lever movable in a predetermined direction to effect an exposure; and
said spring force relieving means includes means associated with said shutter release lever for relieving the force of said spring means on said sensing member upon movement of said shutter release lever in said predetermined direction.

6. The improvement as defined in claim 5 wherein said means associated with said shutter release lever includes means for moving said control member away from said sensing means upon movement of said shutter release lever in said predetermined direction.

7. In a camera adapted to receive roll film perforated at predetermined metering intervals and having (1) an exposure mechanism operable to make an exposure, (2) a shutter release lever movable to operate said exposure mechanism, (3) transport means for advancing received film along the camera's exposure plane, (4) a film sensing member movable by advancing film from a first position extending into a film perforation advanced into alignment with said sensing member to a second position in the direction of film advancement; the improvement comprising:
spring means for applying a resilient force to said sensing member in a direction urging said sensing member from its second position toward its first position; and
means associated with said spring means and said shutter release lever for at least partially relieving said resilient force upon movement of said shutter release lever to operate said exposure mechanism.

* * * * *